(12) United States Patent
Fischer et al.

(10) Patent No.: US 6,572,186 B1
(45) Date of Patent: Jun. 3, 2003

(54) MULTIPLE FUNCTION SLEEVE

(75) Inventors: Harald Fischer, Unterensingen (DE); Heiko Malsch, Heiningen (DE); Hansjorg Walk, Reutlingen (DE)

(73) Assignee: Lear Corporation, Southfield, MI (US)

( * ) Notice: Subject to any disclaimer, the term of this patent is extended or adjusted under 35 U.S.C. 154(b) by 110 days.

(21) Appl. No.: 09/678,992

(22) Filed: Oct. 4, 2000

(30) Foreign Application Priority Data

Oct. 4, 1999 (DE) .......................................... 199 47 621

(51) Int. Cl.$^7$ ............................................ B60R 21/055
(52) U.S. Cl. ................................. 297/216.12; 297/410
(58) Field of Search ........................... 297/216.12, 391, 297/410, 408

(56) References Cited

U.S. PATENT DOCUMENTS

| | | |
|---|---|---|
| 2,869,622 A | 1/1959 | Petersen et al. |
| 3,008,767 A | 11/1961 | Fox |
| 3,397,911 A | 8/1968 | Brosius, Sr. |
| 3,498,670 A | 3/1970 | Finch et al. |
| 4,082,354 A | 4/1978 | Renner et al. |
| 4,190,291 A | 2/1980 | Korger |
| 4,511,180 A | 4/1985 | Klaus |
| 4,626,028 A | 12/1986 | Hatsutta et al. |
| 5,011,225 A | 4/1991 | Nemoto |
| 5,205,585 A | 4/1993 | Reuber et al. |
| 5,378,043 A | 1/1995 | Viano et al. |
| 5,484,189 A | 1/1996 | Patterson |
| 5,664,841 A | 9/1997 | Dal Monte |
| 5,823,619 A | 10/1998 | Heilig |
| 5,884,968 A | 3/1999 | Massara |
| 5,927,804 A | 7/1999 | Cuevas |
| 6,017,086 A * | 1/2000 | Meyer et al. .......... 297/216.12 |
| 6,019,424 A | 2/2000 | Ruckert et al. |
| 6,126,238 A * | 10/2000 | Klindworth ............ 297/216.12 |
| 6,352,285 B1 * | 3/2002 | Schulte et al. ......... 297/216.12 |

FOREIGN PATENT DOCUMENTS

GB 2069584 * 8/1981 ............ 297/216.12

* cited by examiner

Primary Examiner—Peter R. Brown
(74) Attorney, Agent, or Firm—Bill C. Panagos

(57) ABSTRACT

The invention relates to a vehicle seat including a seat part, a backrest, and a height adjustable headrest which is displaceably guided by at least one guide rod and associated guide receivers in the backrest. An active head support system is provided through which the headrest is brought into a predetermined protection position in the event of an accident. The guide receivers are formed by a sleeve element which is inserted into a recess in the backrest.

15 Claims, 3 Drawing Sheets

FIG. 1
FIG. 2
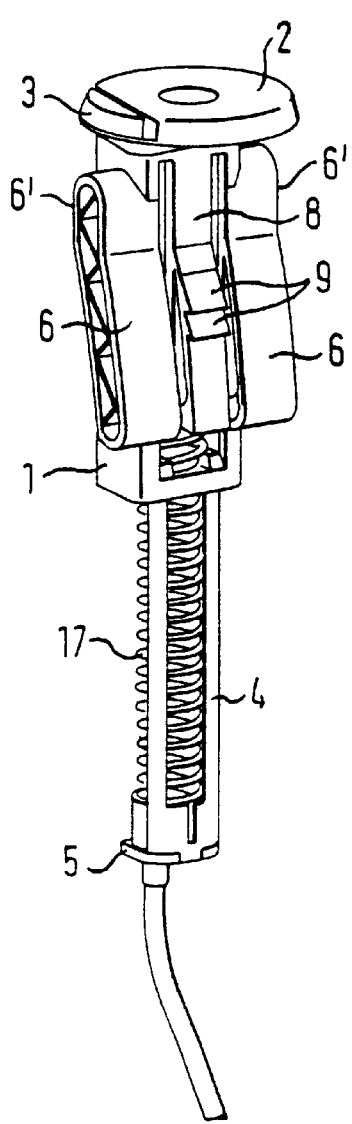
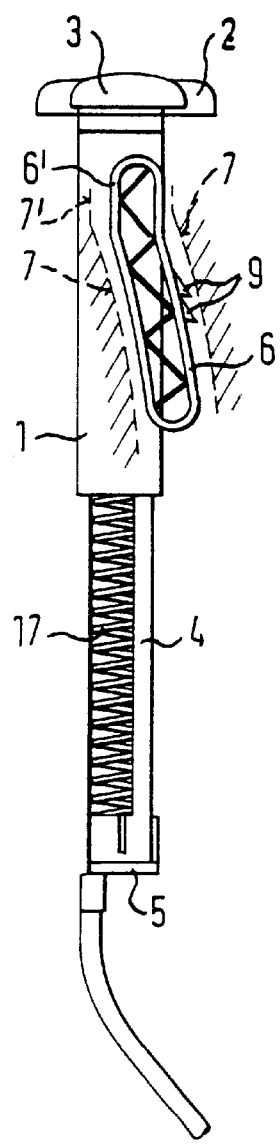

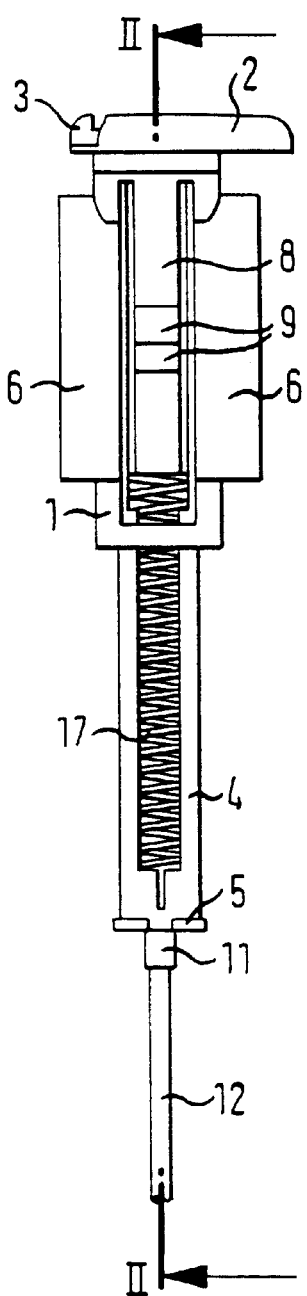
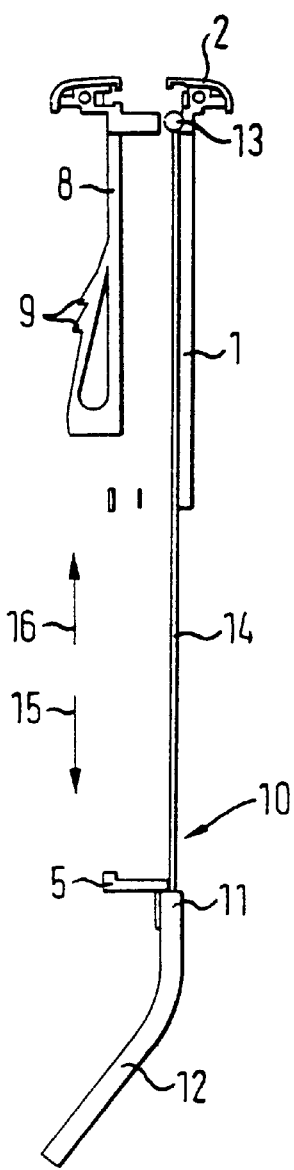

MULTIPLE FUNCTION SLEEVE

TECHNICAL FIELD

The present invention relates to a vehicle seat comprising a seat part, a backrest, a height adjustable headrest which is displaceably guided by at least one guide rod in associated guide receivers in the backrest, and an active head support system through which the headrest is brought into a predetermined protection position in the event of an accident, with the guide receivers in each case being formed by a sleeve element which is inserted into a recess in the backrest,

BACKGROUND ART

Seats for means of transport, in particular, are increasingly being fitted with an active head support system, by means of which the headrest is brought into a position displaced forwardly and upwardly in the event of a rear end impact, at which position the headrest is as close as possible to the head of a person sitting in the seat and thus offers enhanced protection. A known system of this kind comprises rods accommodated in the backrest of the seat which move the headrest into the predetermined position via the guide receivers for the headreset rods. Guide elements are accommodated in the backrest so that the headrest executes this desired movement when the system is triggered.

DISCLOSURE OF INVENTION

It is the object of the invention to simplify a seat of the kind first mentioned with respect to its construction and so to lower the manufacturing costs.

This object is satisfied by the sleeve element being made with a guiding function for the movement of the headrest when the active head support system is triggered, in addition to the guiding function for the traveling in and out of the headrest.

There is no need for separate guide elements thanks to the additional design of the sleeve element with a guiding function for the movement of the headrest when the active head support system is triggered. The sleeve element advantageously has a dual function. The costs of manufacture and storage are thereby advantageously reduced.

In accordance with one embodiment of the invention, the sleeve element has a sleeve section to guide a headrest rod and a guide section, arranged in particular on the outside of the sleeve section to guide the sleeve in a guide which is provided in the backrest and whose shape determines the movement of the sleeve when the active head protection system acts on the headrest during an accident. The headrest movement is advantageously simultaneously predetermined by the sleeve movement predetermined in this way in the event of the active head protection system being triggered so that the headrest safely reaches the desired protection position.

The shape of the guide and of the guide section preferably ends with a vertical section at the upper end. In this way, the headrest is prevented from being manually displaced in the direction of the protection position. Such an unwanted displacement can, for example, take place by pressing onto the headrest from behind in a horizontal direction. The force exerted is directed perpendicularly to the guide shape due to the upper vertical section and so has no effect.

The guide section can, for example, be made in the form of two blocks spaced from one another and arranged like wings on the guide sleeve and the guide in the backrest can be made as a rail comprising the guide section of the sleeve element. A stable and secure guiding can be ensured in this way.

In accordance with a further embodiment of the invention, the sleeve element is additionally provided with latch means by which the headrest position set by the active head protection system can be blocked against being reset. This blocking of the headrest position ensures that the headrest can exercise its protective function ideally in the set protection position even in the event of a multiple impact. The arrangement of the latch means required for this on the guide sleeve has, in turn, the advantage that separate latch means are not required. The guide sleeve is thereby given a further function which again has a favorable effect on the costs of manufacture and storage.

The latch means are preferably made releasable to free the head rest position. The headrest can be moved back into its starting position in this way after the end of the danger situation.

In accordance with a special embodiment of the invention, the releasable latch means are formed as a tongue arranged in particular between the two blocks and having outwardly directed latch projections. A compact design results in this way with a simultaneously good engagement possibility of the latch means.

It is also preferred to have the guide section and/or the latch means formed on the sleeve element. This also has advantages in the manufacture and assembly of the seat as the total number of parts is reduced.

In accordance with another embodiment of the invention, the sleeve element is formed to support a Bowden cable which can, for example, serve the electrical traveling in and out of the headrests or the actuation of a release device for a manual headrest with an automatic retraction when the backrest is folded forward. In this way, a separate component is again saved and thus the total number of parts reduced. The sleeve element is given a multi-function in this way by means of which the costs of manufacture and assembly can be cut further.

In accordance with a further embodiment of the invention, the sleeve element has means whereby the triggering of the active head protection system can be signaled. For example, the sleeve section visible after triggering can have a signal color or an indicator can be released. The sleeve element is given a further function in this way so that a further separate component can be saved.

In accordance with a further embodiment of the invention, means are provided on the sleeve element whereby, to prevent the risk of injury, a triggering of the active head protection system is prevented when the headrest has been removed. For example, a locking lever can be arranged on the sleeve which is moved from a release position into a position blocking the movement of the sleeve element out of the receiver in the backrest when the headrest rod is removed. The sleeve element is given yet another function in this way and replaces yet another separate component.

BRIEF DESCRIPTION OF DRAWINGS

An embodiment of the invention is shown in the drawing and is described below. There are shown, in a schematic representation in each case:

FIG. 1 is a perspective view of a sleeve element in accordance with the invention;

FIG. 2 is a section through the sleeve element of FIG. 1 in accordance with line II—II in FIG. 3;

FIG. 3 is a top view of the front side of the sleeve element of FIG. 1;

FIG. 4 is a section through a detail of the sleeve element of FIG. 1;

BEST MODE FOR CARRYING OUT THE INVENTION

Figures 5, 6:
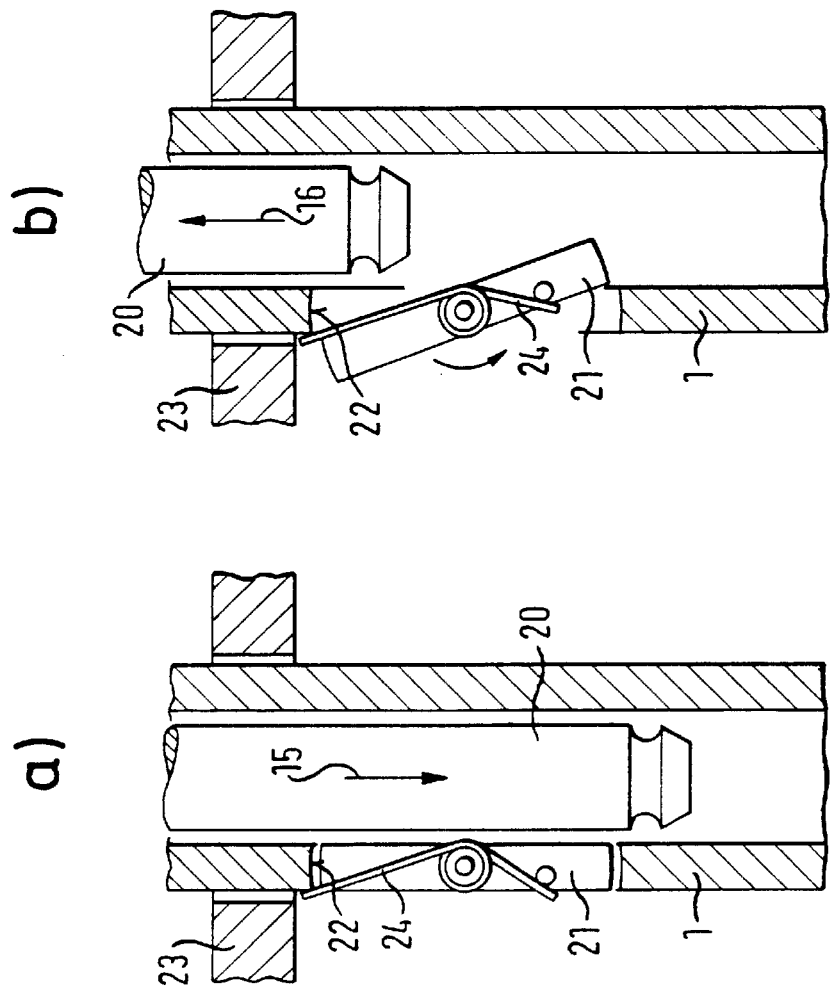
FIG. 5 is a section through a variant of the sleeve element in accordance with the invention.
FIG. 6 is a section through a detail of yet another version of the sleeve element in accordance with the invention.

The sleeve element shown in FIG. 1 which can be inserted into a receiver of a backrest of a vehicle seat (not shown here) comprises a sleeve section 1 at whose upper end a connection plate 2 having a latch element 3 releasable by pressing in is arranged and into or out of which a rail 4 having a stop 5 for a headrest rod (also not shown here) can be traveled from below. Two guide blocks 6 spaced from one another and pointing laterally outwardly like wings are formed on the outside of the sleeve section 1 and their contour, as can be seen in particular in FIG. 2, is formed in accordance with a guide rail 7, by which the direction of movement of the sleeve element is predetermined when the active head protection system is triggered. The shape of the contour of the blocks 6 and the rail 7 here ends in a vertical section 6', 7' at the top so that a horizontal force pressing onto the headrest from behind cannot result in the sleeve element being lifted out of the backrest.

Moreover, a tongue 8 is provided between the two blocks 6 which is also formed with its upper end on the sleeve section 1 and which extends approximately parallel to the two blocks 6. The tongue 8 is provided with latch projections 9 on its side pointed outwards which cooperate with latching recesses (not shown) to fix the sleeve element in the traveled-out position after the active head protection system has been triggered. The tongue 8 can be moved elastically in the direction of the sleeve section 1 due to the forming of the tongue 8 to the sleeve section 1 on one side and thus the latch projections 9 can be moved out of the latch receivers of the rail 7. In this way, the latching can be released to move the guide sleeve back into its starting position.

It can be seen in FIG. 4 that, additionally, a Bowden cable can be supported on the sleeve element. An end 11 of the jacket 12 of the Bowden cable 10 is supported on the stop 5, while an end 13 of the pull rope 14 of the Bowden cable 10 acts on the upper end of the sleeve section 1. The headrest rod is pushed out of the sleeve element in the direction of outward travel by the stop 5 by actuation of the Bowden cable 10, which can, in particular, take place via an electric motor. Each position of the headrest between a completely extended position and a completely retracted position can be set by a corresponding actuation of the electric motor. A compression spring 17 is provided to travel the headrest in the direction of insertion 15 which is supported by the stop 5 at the one end and the sleeve section 1 at the other. To travel the headrest back in, the electric motor is actuated in the reverse direction of rotation, whereby the pull rope 14 of the Bowden cable 10 is released so that the compression spring 17 can push in the headrest rod accordingly in the direction 15.

The sleeve element can have means as further means by which the triggering of the active head protection system can be signaled, means by which a triggering of the active head support systems is prevented when the headrest is removed and means by which the headrest can be automatically displaced into its retracted position when the backrest is folded forward.

In the variant shown in FIG. 5, a Bowden cable 10 is also supported on the sleeve element. The end 11 of the jacket 12 of the Bowden cable is supported on the sleeve section 1 and the end 13 of the pull wire 14 acts on the latch element 3 in the direction of release in this version. The other end of the Bowden cable 10 is connected to a backrest fitting in such a way that the pull wire 14 of the Bowden cable 10 is pulled when the backrest is folded forward. In this way, the latch element 3 is moved into its release position when the backrest is folded forward. The headrest is thus automatically moved into its retracted position when the backrest is folded forward when the latch element 3 is released by the compression spring 18 which, in this version, is supported at its one end on the stop plate 2 of the sleeve section 1 and, at its other end, via an accommodating slide 19 on the lower end of the headrest rod 20.

In the version shown in FIG. 6, a locking lever 21 designed as a rocker is pivoted in the sleeve section 1 of the sleeve element in accordance with the invention in such a way that it can be pivoted between a release position shown in FIG. 6a and a locking position shown in FIG. 6b. The locking lever 21 fits flushly into a recess 22 of the guide section 1 in the release position while one end projects outwardly over the guide section 1 in the locking position. This end comes into engagement with a backrest metal sheet 23 when the sleeve element is loaded by the active head support system in the direction of extension 16. A traveling out of the sleeve element is thereby prevented in the locking position of the locking lever 21.

The position of the locking lever 21 is determined by the headrest rod 20, by the headrest 20 forcing the locking lever 21 into its release position against the force of a spring 24 biased in the direction of the locking position. When the headrest rod 20 is removed, the spring 24 comes into effect and pivots the locking lever 21 into its locking position.

The sleeve element is given a multi-function in accordance with the invention, whereby a corresponding number of separate components can be saved and thus the cost of manufacture and assembly lowered. The different functions can each be combined, also in part and in any manner, with one another in the sleeve element.

While the best mode for carrying out the invention has been described in detail, those familiar with the art to which this invention relates will recognize various alternative designs and embodiments for practicing the invention within the scope of the appended claims.

What is claimed is:

1. A vehicle seat comprising:
    a backrest;
    a guide disposed within the backrest;
    a height adjustable headrest;
    a headrest rod for displaceably guiding the headrest; and
    a sleeve element disposed within the backrest and configured to guide movement of the headrest to a predetermined protection position upon a vehicle impact, the sleeve element including a sleeve section for guiding the headrest rod when the headrest height is adjusted, and a guide section disposed on the sleeve sections and movable relative to the guide for guiding the sleeve element to thereby guide the headrest toward the predetermined protection position.

2. The vehicle seat of claim 1, wherein the guide and the guide section each include a corresponding vertical section configured to inhibit movement of the sleeve element out of the backrest when a horizontal force is applied to the headrest.

3. A seat in accordance with claim 2, characterized in that the guide section is made in the form of two blocks spaced from one another and disposed like wings on the sleeve section, the two blocks being configured to move within the guide.

4. The vehicle seat of claim 1, wherein the sleeve element is movable between a starting position and a traveled-out position, and further comprises a latch means cooperable with the guide to fix the sleeve element in the traveled-out position.

5. A seat in accordance with claim 4, characterized in that the latch means is made releasable to allow the sleeve element to move toward the starting position.

6. A seat in accordance with claim 5, characterize in that the guide section comprises two blocks spaced from one another and disposed on the sleeve section, and in that the releasable latch means is made as a tongue arranged in particular between the two blocks and having outwardly directed latch projections for engaging the guide to fix the sleeve in the traveled-out position.

7. The vehicle seat of claim 4, wherein the latch means comprises a latch projection configured to mate with a latch receiver on the guide.

8. The vehicle seat of claim 7, wherein the sleeve section comprises an elastically movable tongue having the latch means formed thereon.

9. The vehicle seat of claim 1, wherein the guide section is formed on the sleeve section.

10. The vehicle seat of claim 1, further comprising a Bowden cable, and wherein the sleeve element further includes a stop, the Bowden cable being supported on the stop and configured to move the stop to push the headrest rod out of the sleeve element.

11. A seat in accordance with claim 1, wherein the sleeve element is movable between a starting position and a traveled-out position, and wherein means are provided on the sleeve element by which movement of the sleeve element to the traveled-out position is prevented when the headrest has been removed.

12. A seat in accordance with claim 11, wherein the movement prevention means includes a locking lever arranged on the sleeve element which is moved from a release position into a position blocking the movement of the sleeve element out of the backrest when the headrest rod is removed.

13. The vehicle seat of claim 1, wherein the guide section comprises a guide block configured to move within the guide.

14. The vehicle seat of claim 1, wherein the guide comprises a guide rail configured to cooperate with the guide section for guiding the sleeve element.

15. A seat in accordance with claim 1, wherein the sleeve element includes a means for signaling that the headrest had been moved into the predetermined protection position.

* * * * *